(12) United States Patent
Shaikh

(10) Patent No.: US 6,335,732 B1
(45) Date of Patent: Jan. 1, 2002

(54) EXTERNAL RECOGNITION AND RENDERING METHOD

(76) Inventor: Mohammad Salim Shaikh, 7512 Sweetbriar, College Park, MD (US) 20740

( * ) Notice: Subject to any disclaimer, the term of this patent is extended or adjusted under 35 U.S.C. 154(b) by 0 days.

(21) Appl. No.: 09/074,373

(22) Filed: May 8, 1998

(51) Int. Cl.$^7$ ............................................. G06T 15/30
(52) U.S. Cl. ..................................... 345/421; 345/423
(58) Field of Search ................................. 345/435, 421, 345/422, 419

(56) References Cited

U.S. PATENT DOCUMENTS

| | | | | |
|---|---|---|---|---|
| 5,414,801 A | * | 5/1995 | Smith et al. | ................. 345/419 |
| 5,986,662 A | * | 11/1999 | Argiro et al. | ................. 345/422 |
| 5,995,108 A | * | 11/1999 | Isobe et al. | ................. 345/421 |

OTHER PUBLICATIONS

Hechbert, P.S., (Apr. 1987) Ten Unsolved Problems in Rendering, Workshop on Rendering Algorithms and Systems, *Graphics Interface '87*, Toronoto, Canada.

Srihari, S.N. (1984) Multi–resolution 3–d Image Processing and Graphics, *Multiresolution Image Processing and Analysis*, ed. Rosenfeld, A., pp. 224–236, Springer Verlag, New York.

Gortler, S.J. and Cohen, M.F., (Apr. 1995) Hierarchical and Variational Geometric Modeling with Wavelets, *Proceedings of the 1995 Symposium on Interactive 3D Graphics*, Montercy, Canada.

Harten, A., (Oct. 1994) Multiresolution Represenation and Numerical Algorithms: A Brief Review, *NASA Contractor Report 194949*, ICASE Report No. 94–59,.

Gauch, J.M. (1992) *Multiresolution Image Shape Description*, Springer Verlag, New York.

Hechbert, P.S. and Garland, M. (May 1994) Multiresolution for Fast Rendering, *Proceedings of Graphics Interface 94*, Banff, Alberta, Canada.

* cited by examiner

*Primary Examiner*—Mark Zimmerman
*Assistant Examiner*—Huedung X. Cao
(74) *Attorney, Agent, or Firm*—Liniak, Berenato, Longacre & White

(57) ABSTRACT

A method for taking advantage of external recongnition to thereby render only those computer generated objects that are from any orientation and viewing angle. Internal components and hidden components are omitted from the rendered image. This method applies only to assembly and sub-assembly models and not to individual components models.

11 Claims, 3 Drawing Sheets

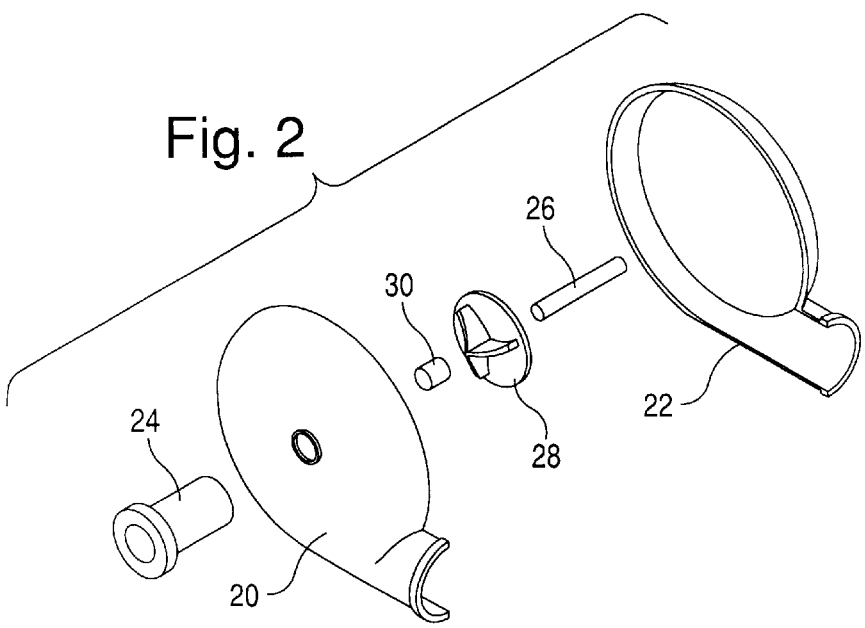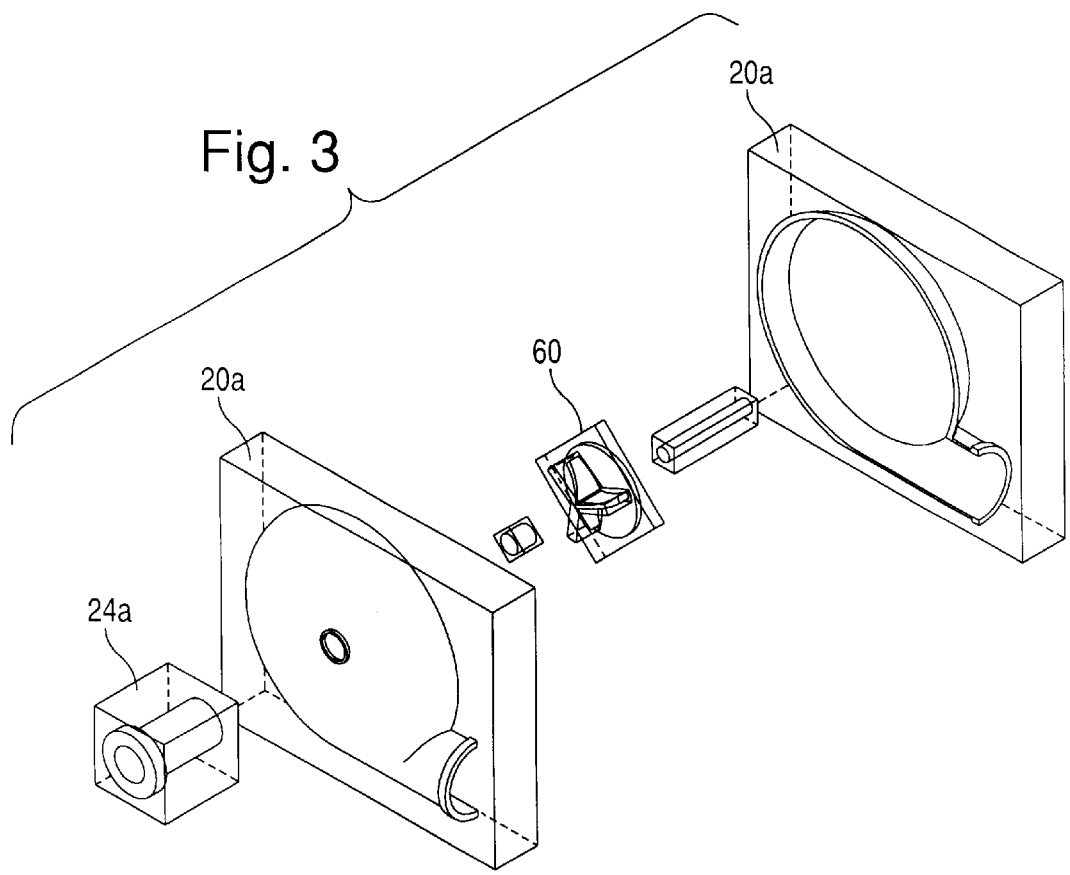

EXTERNAL RECOGNITION AND RENDERING METHOD

BACKGROUND OF THE INVENTION a) Field of the Invention

The present invention relates to a method and associated computer software for improved visualization and interaction with three dimensional graphics, whereby the system renders only what the user sees and does not waste time rendering hidden components.

b) Description of Related Art

Recent modeling simplification efforts, using Computer Aided Design (CAD) systems, focus on reducing the number of polygons in a visual model. Surfaces in CAD model are tessellated to generate polygons. The collection of polygons is then used as a visual model. The current method relying on the polygon based "Level of Details" (LOD) approach is unwieldy. It requires loading all the information about the entire mechanical model. Such a data set far exceeds the capability of present-day graphics hardware to interactively render the model, no matter the polygon count. Today, modeling applications demand an instantaneous, interactive display of models.

Heckbert in "Ten Unsolved Problems in Rendering, Workshop on Rendering Algorithms and Systems" provided a list of ten unsolved problems in simplifying models for rendering. Among them is the problem of how to more fully automate the levels of details and hierarchical bounding boxes. Heckbert noted that setting up a level of details database is burdensome and causes uneven transitions when switching levels. For simulation work, this is quite unacceptable.

Researchers have investigated and pursued numerous simplification approaches. Among them are the octree, wavelet and the favored multi-resolution technique. Srihari in "Multi-resolution 3-d Image Processing and Graphics" showed how octree models can be used for displaying voxel-based images at different levels of detail. In an octree, each level of the tree increases the resolution by a factor of eight. This allows one to view an object as a gradual process proceeding from a father node to its sons. Gortler, et al in "Hierarchial and Variational Geometric Modeling with Wavelengths" used the hierarchical nature of wavelet basis functions to obtain multi-resolution control point and least squares control. A wavelet basis represents a solution hierarchically. In wavelet based schemes, the user chooses the resolution level 1, and then only the quantities of basis function on level 1 are altered. However, multi-resolution models are the models of choice for simplifying renderings and simulations. A few researchers such as Harten ("Multiresolution Representation and Numerical Algorithms") and Gauch ("Multiresolution Image Shape Description") have developed multiresolution techniques.

In 1994, Heckert et al. presented "Multiresolution Modeling For Fast Rendering" which surveyed multi-resolution techniques for accelerated rendering and found that a polyhedral simplification method was the most appropriate for accelerated rendering and simulation. Subsequently, commercial packages that used the multi-resolution technique became available. Among them are: the 3D Accelerator (see Rossignac et al., "Multi-resolution 3D approximations for rendering complex scenes"), a polyhedral simplification method, and Deneb Robotics optional package called HIFI, which is a polygonal simplification method.

However, the multi-resolution modeling technique has limitations. Multi-resolution models are scene dependent. They require the preparation of a level of details database for each scene. This is a lengthy process that requires input from the user for each scene and each model. All objects (external and internal) must be prepared, stored in the database, and rendered whether or not the objects are visible during the simulation.

Decomposing a CAD model into polygons before rendering it for visualization typically produces thousands of polygons. The software algorithms that underlie the modeled object, generate an eveN smaller set of polygons that are visually similar to the original object. By creating multiple levels of detail (fore, mid and background) at varying resolutions, the work of a graphics engine is reduced. However, important visible features are lost in such simplification processes. Moreover, the polygonal simplification methods still cannot deliver the requisite display speed for large mechanical models.

A mechanical environment consists of whole mechanical parts and assemblies. A person recognizes a piece of equipment not by taking it apart and investigating its internals, but by simply looking at its external surfaces, its "container." No one needs to take apart an automobile to recognize what it is, even though the interior parts are hidden from the viewer. The polygon based LOD technique loads all the information, both interior and external, and does not take advantage of the physical reality of a mechanical environment.

SUMMARY OF THE PRESENT INVENTION

The present invention seeks to overcome the drawbacks inherent in the prior art by providing a method for taking advantage of external recognition to thereby render only what is visibly displayed to the user. Internal components and hidden components are omitted from the rendered image.

The invention set forth herein is considerably more efficient because it is scene independent. It processes the CAD models, and prepares a simplified visual container database off-line. It guarantees that only visual objects of an assembly are loaded and rendered for simulation. Internal objects are loaded and rendered as needed. All the processing is done off-line. Simulation time decreases because there are few surfaces to display. This method makes it a powerful tool for faster rendering and simulation.

Taking advantage of this external recognition makes it possible to display CAD models much faster than is currently possible. Significant computational efficiencies are produced by decoupling the internal and external components of a visual assembly. The external container is displayed and manipulated without loading all the visual geometry information. Internal component information is loaded into the display engine only as it is needed.

A key concept underlying the container approach of this invention is the use of a mechanical component (MC) object. This object is a CAD model (solid or 3D surface) of a mechanical component. An MC object is comprised of either the 3D surfaces or the primitive solids and not the tesselated polygons. In a given assembly an MC object may contain, be contained within, penetrated in, abut, or be similar to another MC object.

A generational paradigm helps define the relationship between the MC objects of an assembly. Object positions can be identified through a "relationship tree." An MC object that contains one or more objects is a 'parent' object. The objects within the parent object are its 'children.' Two penetrating objects are 'spouses', whereas objects sharing a common boundary are 'siblings.' Two identical objects are 'twins.' A cluster of related objects comprise the 'assembly.' Using the concept of containers and the concept of MC objects, the present invention proposes software to significantly reduce the level of detail required for visualization.

To create improved visualization speed, the proposed invention: 1) extracts from existing CAD models an assembly's combinatorial (topological) structure and metric (geometric) information; 2) separately identifies the external, visible features from the interior ones; 3) display only the assembly's visual geometry; and 4) link the original CAD model components within an assembly to its visually displayed "container" geometry.

The present invention sets forth an Automatic Container Simplification (ACS) system which can meet the aforementioned requirements and include the following features:

(1) a visual container database that is based on the surfaces that are visible to the viewer;

(2) a container database that is compatible with multi-resolution modeling schemes as well as display systems;

(3) a database that is comprised of surfaces and, therefore, can be directly rendered;

(4) simplified models that retain all important visible features;

(5) viewing angle and orientation independent visibility for users;

(6) visual container database preparation off-line to speed up the on-line interactive visialization with users; and (7) an interactive on-line link to all container objects, as well as MC objects (CAD models) during display.

These and other benefits of the present invention will become apparent to those of skill in the art with reference to the following drawings and description.

BRIEF DESCRIPTION OF THE DRAWINGS

FIG. 2 illustrates an exploded view of a pump showing its components: a volute casing, casing cover, suction pipe, pump shaft, impeller, and hub.

FIG. 3 shows the containment boxes such that each box encloses a component.

DETAILED DESCRIPTION OF PREFERRED EMBODIMENT

Figure 1:
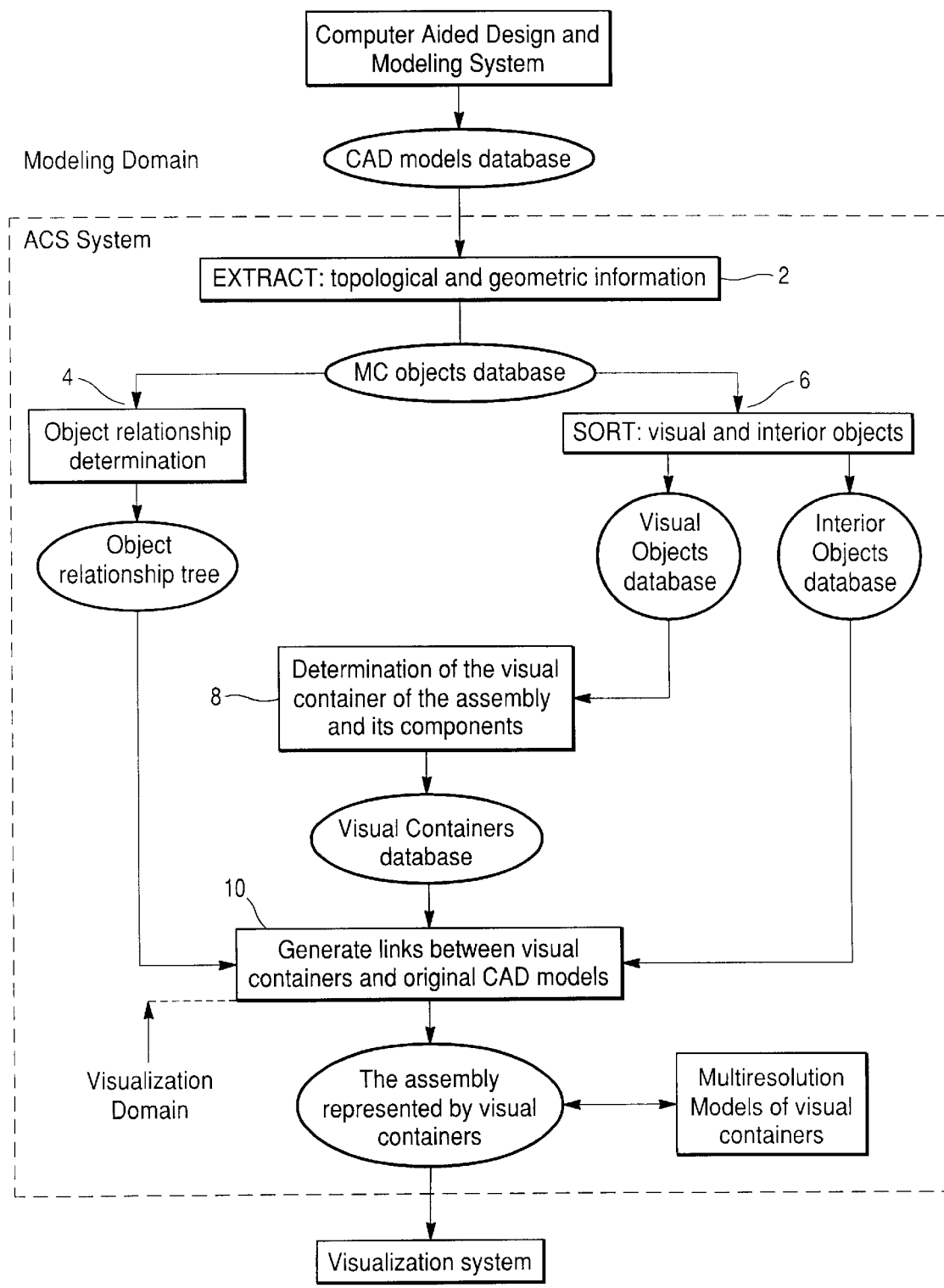
FIG. 1 is a flow diagram showing algorithms of the automatic container simplification system of this invention.

The automatic container simplification or ACS system of this invention is comprised of innovative algorithms. These algorithms generate the mechanical assembly's equivalent visual container. FIG. 1 is a flow diagram showing five algorithms of the ACS system. The five algorithms are described as follows:

first, at step 2 the algorithm that extracts the visual information such as shape, color, material type, and surface texture, from the CAD model and maintains the pointers to the original CAD models;

second, at step 4 the algorithm that classifies the relationship of MC objects to each other and creates a relationship tree. The relationship tree pointers identify the links among objects; that is, whether they are children, siblings, spouses, or twins;

third, at step 6 the algorithm to sort objects into exterior and interior objects. This algorithm determines the external visibility of MC objects. Objects are sorted into externally visual objects, or interior non-visible objects;

fourth, at step 8 the algorithm that calculates the container by determining the visual objects in each assembly and the MC objects attached to each assembly; and fifth, at step 10 the algorithm that maintains a link between the assembly's visual container and the original CAD model. The hierarchical relationship between the assembly and its MC objects is retrieved from the object's relationship tree.

Using a file transfer and translator program to import and export information, the ACS system shall interface with popular CAD and visualization systems. Usually a CAD system either uses the proprietary database to store CAD models or allows the storage in a standard format, for example, IGES or PDES. A translator program will import the CAD models into the ACS system and another program will export the visual containers to a visualization program. Additionally, the ACS system will prepare a visual container database that is suitable for preparing LOD multiresolution models.

The software modules of the ACS system will now be described along with the details of the tasks of each module and, lastly, the mathematical underpinnings of the ACS system algorithms.

As shown in FIG. 1 and described above, the ACS system is comprised of five major algorithms. The operation of the partial ACS system will now be demonstrated for two test assemblies. The specific tasks involved are reading visual data for two test assemblies and generating in the ACS system the corresponding visual container database, implementing the algorithms that sort the objects of an assembly into external and internal (visible and invisible) objects and determining the visual container for the assembly and its MC objects, displaying the test assembly visual container models, and reading visual container data for two assemblies and transporting it to the display program.

First, the basic software modules of this invention process the CAD models of components of two test assemblies and extract the visual information from the CAD models. The invention then sorts the objects in a given assembly for interior and visible objects. Next, the system determines the visual containers for a set of visible objects and their assembly and transfers the visual container data of two test assemblies to the visualization program whereby the assemblies are displayed.

The next sections describe the definitions, procedures, and major algorithms used to implement the ACS system.

The first algorithm of the ACS system classifies the objects in an assembly, defining those that are penetrated, adjacent, containing another object, or contained within an object. The algorithm can best be described by taking two objects and testing for containment or intersection.

When an object is not contained within another object, it is either adjacent to or penetrates the other object. For object classification, it is first determined whether or not one is contained within the other. Hoffman, "Geometric and Solid Modeling: An Introduction" provides an algorithm, called the "line/solid classification algorithm", to determine whether or not an object is within another given object. The line/solid classification algorithm may be described as follows: Take two points p and q on two non-intersecting bounding objects A and B. The two points are connected by an imaginary line segment. This line segment is then analyzed for how it (p,q) intersects with the boundaries of A and B. The segment intersects the boundaries of A and B in a number of points that are ordered linearly and then the line segment is partitioned into many intervals. Each interval is classified as being either outside or inside A, and, either being inside or outside B. Both end points of each interval may lie on the boundaries of only A or only B. However, there are intervals with one end point on the boundary of A and the other end point on the boundary of B. The algorithm chooses the first such interval, scanning the intervals in order beginning at p. A test is then performed to determine whether this interval is inside or outside A and B. If the interval is outside A but inside B, then A is contained with B. However, if the interval is inside A and outside B, then B is contained in A.

The second algorithm in ACS system sorts the objects in an assembly for external (visual) or interior. However, before detailing the algorithm the notations are described. They are as follows: Given two objects A and B, we can say that either B is within A, B penetrates A, B is adjacent to A, A and B are identical, or A and B are isolated from each other. If B is completely enclosed by A then B is a child of A denoted $B \subset A$. If B penetrates A, then B is a spouse of A and is denoted $A \cap B$. If B is adjacent to A then B is a sibling of A and is denoted A U B.

Consider N objects $Y_1, Y_2, \ldots, Y_N$, forming a set Y. Let there be a set Z of M<N objects such that Z is a subset of Y. An object $Y_j \epsilon Y, j=1, \ldots, N$ is also a member of the set Z, if $$Y_j \subset Y_i, \text{ and} \quad (1)$$

$$Y_j \cap Y_i = \emptyset \quad (2)$$

j=1, . . . ,N, i=1, . . . ,M. M<N.

An object $Y_j$ is a child of another object $Y_i$ if $Y_j \cap Y_i = Y_j$ and the two objects $Y_j$ and $Y_i$ are disjointed if $Y_j \cap Y_i = \emptyset$.

The two conditions given above can be used to develop an efficient code that determines the set of visual objects Z of an assembly Y of N objects. The algorithm starts by selecting an object $Y_1$ that is a visual object, that is, $Y_1 \epsilon Z$. This choice is made by the user. The algorithm then picks an object $Y_2$ from the set of N−1 remaining objects and determines whether or not $Y_1$ is a child of $Y_2$. If $Y_1$ is not a child of $Y_2$, that is, $Y_1 \subset Y_2$, then the algorithm determines whether or not $Y_1$ is disjointed from $Y_2$. If $Y_1$ is not disjointed from $Y_2$, that is, $Y_1 \cap Y_2$, then the algorithm selects the next object $Y_3$ from the remaining N−2 objects and determines whether or not $Y_1$ is a child of the next object $Y_3$ or disjointed from it. This process is repeated until all N−1 objects are considered. If object $Y_1$ is not any object's child and is not separated from any N−1 object, then it is considered a visual object. Otherwise it is not. In this manner all N objects are evaluated. The pseudo code of this algorithm is given in Table 1.

TABLE 1

The pseudo code for object sorting is listed below:

```
start with a visual object Y₁
for j=1,N
    Yⱼ∈Z
    for i=j+1,N
        determine if Yⱼ ∩ Yᵢ
        if (Yⱼ ∩ Yᵢ ≠ Yⱼ) then
            if (Yⱼ ∩ Yᵢ = ø) then
                Yⱼ ∉ Z
            else
                Yⱼ ∈ Z
```

TABLE 1-continued

The pseudo code for object sorting is listed below:

```
            endif
        else
            Yⱼ ∉ Z
        endif
    increment j
increment i
```

Important components of the above algorithm are to: (1) determine whether or not a given object $Y_j$ penetrates another object $Y_i$; and (2) if two given objects $Y_j$ and $Y_i$ do not penetrate, then to determine whether or not the object $Y_j$ is a child of the object $Y_i$.

Determining whether or not two objects penetrate and then determining whether or not one is a child of the other is relatively complex. However, it can be greatly simplified by using object containment boxes. The object containment box (OCB) is a minimum rectangular prismatic volume that encloses an object. There are many algorithms available that describe the methods to determine the containment box of a given object. Martin et al. in "Containment Algorithms for Objects in Rectangular Boxes" provided one of these algorithms for 3D objects. Determination of the containment box for a 3D object is a solved problem and one of the available solutions which will be utilized by this invention. This invention however sets forth a procedure using the containment boxes for sorting the interior and visual objects.

In an assembly two object containment boxes can be related to each other in one of five ways: (1) one is contained within the other; (2) they penetrate (protrude from) each other; (3) intersect each other; (4) they are adjacent to (a vertex, edge, or portion of face of one box touches the other box) each other; and (5) they are isolated from each other.

If two containment boxes are adjacent to or intersect each other, they are enclosed by a larger containment box. The larger containment box is then used for further evaluation. This is continued until a containment box contains a cluster of adjacent or intersected boxes. The large containment boxes containing the cluster of objected are then evaluated to determine whether or not one contains the other. If two large boxes are not within each other, the objects enclosed by the two boxes are visual objects. If one large box contains the other, the objects enclosed by the inner box are the interior objects. The objects enclosed by the boxes that penetrate the visual boxes are also visual objects.

Figure 4:
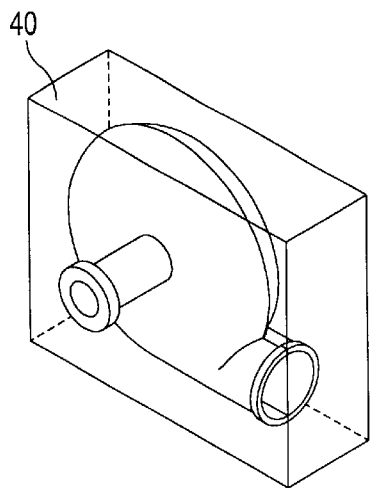
FIGS. 4, 5 and 6 show the larger containment boxes of FIG. 3.
Figure 5:
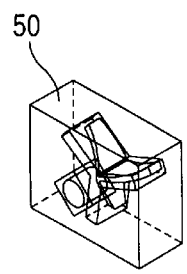
Figure 6:
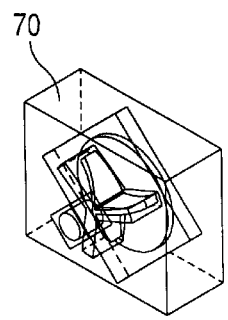

The above procedure is illustrated by an example of a centrifugal pump. Of course, the pump of FIG. 2 is to be rendered in its assembled state, but each component is individually stored on a computer and the following analysis is basedon the category of elements shown individually and assembled. FIG. 2 illustrates an exploded view of a pump showing its individual components: a volute casing 20, casing cover 22, suction pipe 24, pump shaft 26, impeller 28, and hub 30. FIG. 3 shows the containment boxes such that each box encloses a component, i.e., the box 20a encloses the volute casing 20, the box 24a encloses the suction pipe 24, and the box 22a encloses the casing cover 22. Boxes 20a, 24a and 22a are adjacent, therefore a larger box 40 encloses the boxes 20a, 24a, and 22a (see FIG. 4). The boxes enclosing the impellar, impellar vane and hub intersect and are thus enclosed in a larger box 50. Box 50 is adjacent to but does not intersect box 60, therefore, the two boxes 50, 60 are surrounded by a larger box 70. FIGS. 4, 5 and 6 show the larger boxes 40, 50, and 70. The two large boxes, box 40 and 70, are then evaluated to determine whether or not one of the two boxes is contained within the other. Box 70 is contained within box 40, therefore the objects within box 70 are declared interior objects. The objects within box 40 are the visual objects. The box containing the shaft 26 protrudes box 40, therefore it contains a visual object.

This method determines that the visual objects are the volute casing 20, its cover 22, suction pipe with the flange 24, and the pump shaft 26.

The final algorithm of the ACS system determines the visual container for a cluster of visual objects. The visual container is determined by performing the union of the set of visual objects. The union of the visual objects is determined by calculating the intersection of the object surfaces. The intersection of surfaces can be calculated and determined by known methods.

While the foregoing invention has been described in relation to certain algorithms and an example using a pump, it will be understood that this description provides the basic disclosure of the present method whereby a computer graphics system renders only what the user sees and does not waste time rendering hidden components. Of course, changes in form and detail may be made to the foregoing description without departing from the basic inventive method for graphics rendering.

What is claimed is:

1. A method for rendering graphic images, said method comprising the step of:

extracting topological structure and geometric information from a computer generated model;

identifying from said model internal non-visible features that are internal to the model and external visible features that are external to the model;

generating a rendered image comprising only those external visible features of a computer generated model that are visible independent of a user's viewing orientation; visually displaying only said external inviable features as said rendered image.

2. The method of claim 1, further comprising the step of linking the internal non-visible features to the external features.

3. The method of claim 1, wherein hidden components not visible from a user's viewing orientation are omitted from said rendered image.

4. The method of claim 1, wherein components of said model are compared to ascertain intersection of said components.

5. The method of claim 1, wherein first and second components of said model are compared to ascertain if said first component contains said second component.

6. The method of claim 1, further comprising the step of determining a set of external visible features.

7. The method of claim 6, wherein the step of determining said set of external visible features comprises identifying a user-defined visual object.

8. The method of claim 7, wherein at least one additional object is automatically selected and compared with said user-defined visual object to ascertain if said at least one additional object intersects said user-defined visual object.

9. The method of claim 8, further comprising the step of calculating an intersection of said external visible features.

10. The method of claim 8, wherein a second object is compared with said user defined visual object to ascertain if said at least one additional object contains said user-defined visual object.

11. The method of claim 10, wherein a second object is compared with said user defined visual object to ascertain if said at least one additional object is disjointed from said user-defined visual object.

* * * * *